Patented June 16, 1936

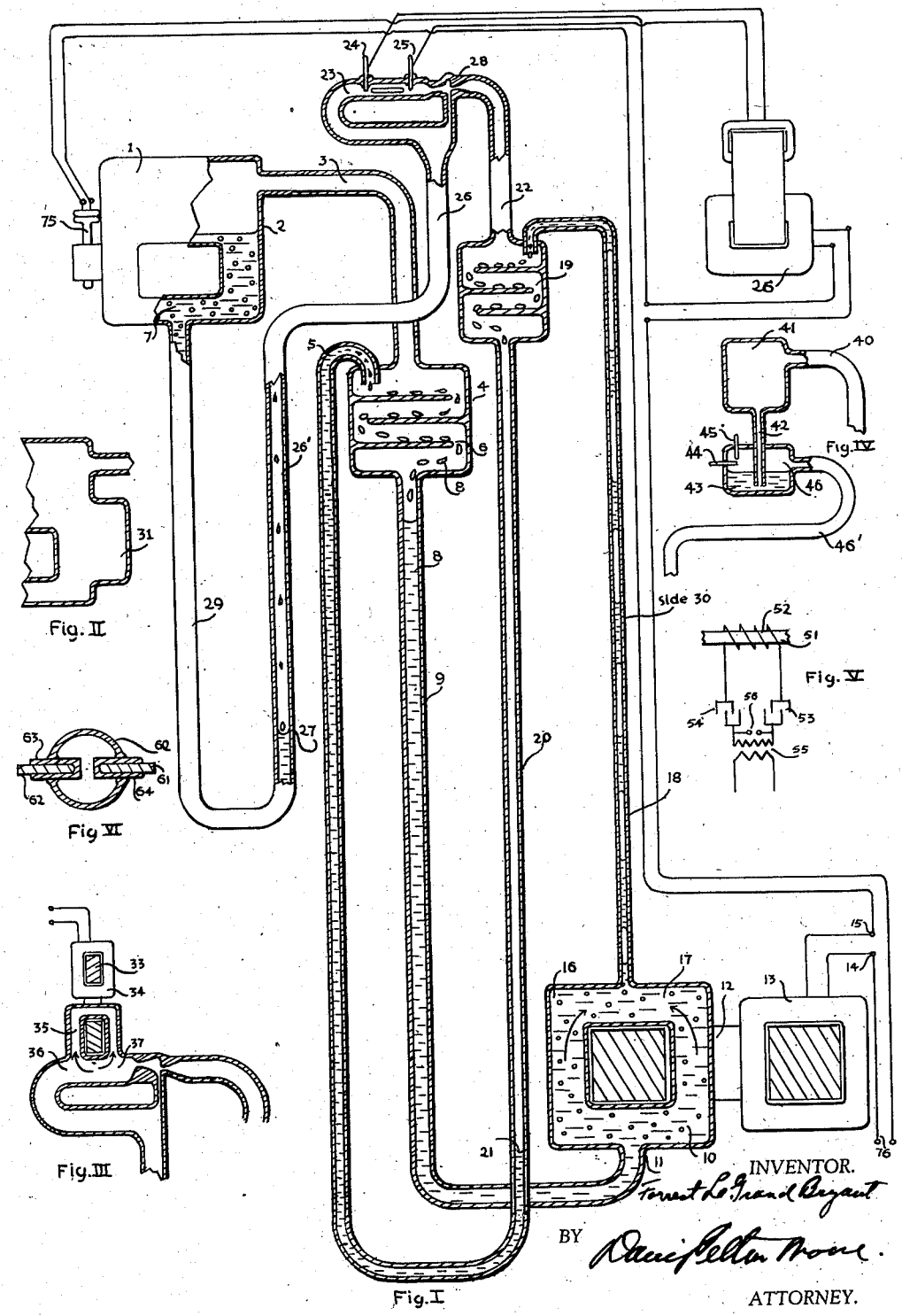

2,044,750

UNITED STATES PATENT OFFICE 2,044,750

ART OF REFRIGERATION AND APPARATUS THEREFOR

Forrest Le Grand Bryant, New York, N. Y.

Application November 19, 1935, Serial No. 50,499

28 Claims. (Cl. 62—153)

This invention pertains to the art of refrigeration and has for its object the provision of a new method of producing refrigeration without machinery or moving parts, and the necessary apparatus therefor. Other objects and advantages will become apparent as the description proceeds.

The method herein disclosed provides for the evaporation of a liquid, preferably water, and the absorption of its latent heat, wherein refrigeration is provided. Simultaneously this water may be drawn from a solution whereupon the heat of dissociation is absorbed and this added to the net refrigerating effect. This water vapor or steam is now absorbed by a solvent, preferably sulphuric acid. Through the sulphuric acid, containing this water, an electric current is passed and causes the water absorbed to break down into its two chemical elements, hydrogen and oxygen which are led to another chamber to be synthesized again to water. After being synthesized the water is led back to the evaporating chamber to again be evaporated and so the process continues. It will be noted that the sulphuric acid is performing two functions at once, namely, absorption and liberation of water and at substantially the same temperature which makes the process continuous in operation, eliminates large heat losses, and overcomes the objectional features of the absorption systems.

The process could be carried on without synthesizing the hydrogen and oxygen but allowing them to pass away into the atmosphere or by using them as a byproduct of refrigeration. In this case additional water would constantly have to be added to the system.

This system provides electric refrigeration without machinery, is simple of construction and eliminates many objectionable features of systems that have attempted this result.

In the preferred embodiment of the invention water would be used as the refrigerant. It is a well known fact that water may be boiled far below its normal freezing point by adding a small amount of salt or acid to prevent freezing. In my structure I provide for producing refrigeration by evaporating water and also by evaporating water while drawing it from solution with sulphuric acid. In the former case some salt or similar substance would have to be provided in the evaporator with the water if temperatures below 0° C. were desired. In the latter case the acid would suffice.

The absorption of water vapor by sulphuric acid is a method used many years past for the production of low temperatures in which case, however, the water absorbed and the acid were heated to remove the water and reconcentrate the acid for further use. Removal of this water by electrolysis may be provided by applying a current to the acid by electrodes or by inducing a current in this solution (water and acid). In the apparatus as shown I induce the current.

Synthesis of the resultant hydrogen and oxygen may be provided in a variety of ways; by catalytic synthesis using a metal as a catalyst, by ionic catalytic synthesis using a gas such as neon, argon, etc., as a catalyst, in a mercury vapor arc using the activated mercury vapor, by ignition or by radio chemical action using an electrical glow and known as glow synthesis, or by photochemical action.

The pressure differences throughout the system which, in normal operation, would amount to about two inches of mercury, are balanced by columns of water and/or sulphuric acid.

Of course, it is understood that other solvents besides sulphuric acid could be used and other solutes besides water forming solutions that would be satisfactory electrolytes. However for the sake of convenience I shall confine the description to the use of water and sulphuric acid.

Referring to the drawing:—

Figure I is the preferred embodiment of my invention;

Figure II is a modification of the evaporating means shown in Figure I;

Figure III is a modification of the synthesizing means shown in Figure I;

Figure IV illustrates a trap that may be used between the electrolyzing chamber and the synthesizing chamber;

Figure V illustrates a method of inducing a current in the gases to be synthesized; and Figure VI shows a method of applying a current to the gases by electrodes for the purpose of performing synthesis.

In Fig. I, 1 represents an evaporator filled to the point 2 with water. The pipe 3 leads from the top of the evaporator 1 to the absorber 4. As concentrated sulphuric acid spills from the tube 5 into the absorber 4 and passes down over plates 6, 6 water vapor is rapidly absorbed and drawn from the evaporator 1 through pipe 3. This causes water 7 in evaporator 1 to boil and absorb heat (its latent heat) producing the desired refrigeration. Now this sulphuric acid 8 and the water that it has absorbed in the absorber 4 passes by gravity down pipe 9 and is led into the electrolysis chamber 10 at point 11. When inside the electrolysis chamber 10 the acid and its solute, water, form a closed turn around the transformer core 12. A current in coil 13 from lines 14, 15 excites a flux which travels around in core 12 and through the closed turn formed by the solution in the electrolysis chamber 10. Naturally a current is induced in this solution which flows in the direction of arrows 16, 17 as the current to coil 13 alternates. This current causes the water contained therein to break down into its chemically component parts hydrogen and oxygen and thus separates the water from the acid concentrating the acid. This hydrogen and oxygen pass up column 18 and percolate slugs of acid along with it to the separation chamber 19. Here the acid separates from the hydrogen and oxygen by gravity and the acid falls through tube 20 to again supply concentrated acid to the absorber 4 through the pipe 5. The difference in pressure between the separator 19 and the absorber 4 is balanced by the liquid columns in tubes 20 and 5. Note the liquid level at point 21 in tube 20. The hydrogen and oxygen which has separated from the acid in separator 19 rises through tube 22 and enters the synthesis apparatus 23. Here it passes through a section of the synthesis apparatus 23 in which it conducts a current from contact 24 to contact 25 which current is supplied from transformer 26. This current due to radio chemical reaction and/or due to raising the gases to their ignition point causes a combustion, the hydrogen and oxygen combining form steam which passes down tube 26' and condensing, collects at point 27 as water. The jet arrangement 28 is to assist recirculation of any hydrogen and oxygen through the current area that did not synthesize on its first passage. In the case of combustion above the ignition point this would not be necessary since in this type of combustion the flame propagates itself throughout the gas by self propulsion. The tubes 18 and 20 serve not only as conducting means but also radiate heat from the acid which has been added in absorber 4 due to the heat of absorption of water in sulphuric acid and in the electrolysis chamber 10 due to the I²R electrical drop. In a like manner tubes 26' and 29 radiate the heat of condensation of water and the heat of association of the acid and water in case acid is used in the evaporator as described later. The water that collects at point 27 passes up through tube 29 to evaporator 1 to replenish the supply that has been evaporated and so the cycle of operation is completed. In the system as described with pure water in the evaporator it would be necessary to add salt or a similar substance to the water to prevent freezing of the refrigerant when obtaining temperatures below 0° C.

From Figure I, it will be seen that if the device is laid on side 30 all the acid and water would gravitate to the lower parts leaving the evaporator 1 empty. Then, upon righting and operation of the device a pure charge of water would collect in the evaporator. It might be desirable however to use a certain amount of sulphuric acid in the evaporator 1 and tube 29 to prevent freezing of the refrigerant and to take advantage of the heat of dissociation. In Figure II, an evaporator with a projection 31 on its side provides that it will retain a certain amount of the acid and water mixture after the device has been turned on side 30. This acid, when the device is righted distributes itself in evaporator 1 and tube 29, prevents freezing of the refrigerant, causes a heat of association when the water from tube 26' meets it at point 27 which heat is liberated from tube 29 and assists in the refrigerating effect by adding the heat of dissociation when the water is drawn from evaporator 1. The water added at point 27 tends to diffuse itself up through the tube 29 to evaporator 1, or as it rises into leg 29 is displaced by the heavier specific gravity of the acid and thus rises into the evaporator. Its heat of association is radiated from tube 29 and upon evaporating in evaporator 1 its heat of dissociation is absorbed in addition to its latent heat.

The numeral 75 indicates a thermostat which controls the current supply from source 76 to electrolysis coil 13 and synthesis coil 26 actuating the system upon a rise in the temperature of the evaporator 1 and discontinuing operation when the temperature has fallen to a predetermined point.

Figure III illustrates an alternative type of synthesis chamber which might be used in place of the one shown in Figure I. In this type a current is induced in a gas to be synthesized, instead of being applied as in Figure I. Referring to Figure III, a flux is caused to flow in core 33 by a current flowing in coil 34. The gas contained in the tube 35 constitutes a closed turn around the transformer core 33 and hence a current is induced therein which flows in the direction of arrows 36 and 37 as the current alternates in the coil 34.

Figure IV illustrates a trap which it may be found advisable to place between the chamber where synthesis takes place and the chamber where electrolysis takes place for the purpose of preventing the synthesizing flame from propagating itself back into the electrolysis chamber. An additional object would be to absorb any shock of combustion. Referring to the drawing, the gas from the electrolysis chamber enters the chamber 41 through the tube 40 and passes down the small tube 42 up through the liquid (water or acid and water) 43 and is synthesized by electrical discharge from the contacts 44 and 45. The resultant water overflows into tube 46 and thence passes to the evaporator in the manner illustrated in Figure I. An increase in pressure in chamber 46 would merely cause the liquid to back up temporarily into tube 42 and chamber 41. Referring again to Figure I it might be advisable to restrict the diameter of some portion of tube 26' to obtain the same result on the other side of the synthesis chamber. The pulsating effect of combustion would assist in causing mixture of the water and acid in tubes 26' and 29 in the structure in which acid is used in the evaporator. To balance pressure drop during synthesis trap Fig. IV would be reversed.

Figure V illustrates a method that may be used in inducing current in the gas to be synthesized, by means of a high frequency current and electrostatic and/or electromagnetic induction. The tube 51 contains the gas in which currents are to be induced and is surrounded by a coil 52 of several coplanar turns. The ends of this coil are connected to two Leyden jars 53 and 54 which jars are charged by means of an interrupterless X-ray transformer 55. The spark gap 56 makes possible the adjustment of the intensity of the excitation.

Figure VI shows a method of applying the voltage to the gas to be synthesized, by electrodes without having the gas come into contact with a metal. The numeral 60 indicates the tube in which the gas is contained through which I wish to pass a current. The electrodes 61 and 62 are sealed into porcelain members 63 and 64 which porcelain has the same coefficient of expansion as the glass composing tube 60 and these porcelain members are in turn sealed into tube 60. The current in this case passes from electrode 62 through porcelain member 63, through the gas contained in tube 60, thence through porcelain member 64 and contact 61, or vice versa.

While the above description includes the preferred embodiment of my invention I reserve the right to make any changes in the method or apparatus that does not depart from the spirit of the invention or the scope of the subjoined claims.

Having thus described my invention what I claim is:

1. The process of refrigeration which comprises evaporating a liquid, absorbing the evolved vapor in a solvent, liberating this solute from solution by breaking it down into its chemically component parts, synthesizing these chemically component parts to form the original liquid again and utilizing the synthesized liquid to replenish that liquid which was evaporated.

2. The process of refrigeration which comprises evaporating a liquid and simultaneously drawing the same from solution, absorbing the evolved vapor in a solvent, liberating this solute from solution by breaking it down into its chemically component parts, synthesizing these chemically component parts to form the original liquid again and utilizing the synthesized liquid to replenish the liquid which was evaporated and drawn from solution.

3. The process of refrigeration which comprises evaporating a liquid, circulating a solvent by percolation to absorb the vapor therefrom, liberating this vapor from its solvent by breaking it down into its chemically component parts, synthesizing the parts to form the original liquid and using this liquid to replenish the original liquid which was evaporated.

4. The process of refrigeration which comprises evaporating a liquid to absorb heat, absorbing the evolved vapor in a solvent, liberating the heat of solution, separating the solute from solution by breaking it down into its chemically component parts, liberating the heat evolved in breaking up the liquid into its chemically component parts, synthesizing these parts to form the original liquid compound, liberating the heat evolved in this synthesis and return to the original liquid form and, replenishing the original liquid evaporated with this product of synthesis.

5. The process of refrigeration which comprises evaporating a liquid and drawing it from solution to absorb its latent heat and heat of dissociation, absorbing the evolved vapor in a solvent, liberating the heat of solution, separating the solute from solution by breaking it down into its chemically component parts, liberating the heat evolved in breaking up the liquid into its chemically component parts, synthesizing these parts to form the original liquid compound, liberating the heat evolved in this synthesis and return to the original liquid form, dissolving this liquid product of synthesis in the solution from which the original liquid was drawn and liberating the heat of solution so evolved.

6. The process of refrigeration which consists in evaporating a liquid, absorbing the evolved vapor by a solvent, liberating the solute from solution by breaking it down into its chemically component parts balancing by a liquid column, the pressure difference between the point where the evaporation takes place and the point where the solute is separated from the solvent synthesizing these chemically component parts to form the original chemical compound, and utilizing the latter compound to replenish the supply originally evaporated and to produce pressure difference between the point where synthesis takes place and the point where evaporation takes place.

7. The process of refrigeration which consists in evaporating a liquid to absorb its latent heat, absorbing the vapor evolved therefrom through the agency of a solvent, passing an electric current through the resultant solution to break up the solute into its chemically component parts, synthesizing these parts to form the original liquid and using this liquid to replenish the supply originally evaporated.

8. The process of refrigeration which consists in evaporating a liquid and drawing it from solution to absorb its latent heat and heat of dissociation, absorbing the vapor evolved therefrom through the agency of a solvent, passing an electric current through the resultant solution to break up the solute into its chemically component parts, synthesizing these parts to form the original liquid and adding this liquid to the solution from whence liquid was originally drawn through evaporation.

9. A process in accordance with claim 7 including direct application of the electric current to the solution by means of electrodes for the purpose of electrolysis.

10. A process in accordance with claim 7 including induction of a current in the solution for the purpose of electrolysis.

11. A process in accordance with claim 7 including radio chemical action to effect synthesis.

12. A process in accordance with claim 7 including ionic catalytic action to effect synthesis.

13. A process in accordance with claim 7 including metallic catalytic action to effect synthesis.

14. A process in accordance with claim 7 including combustion above the ignition point to effect synthesis.

15. A process in accordance with claim 7 including induction of a current in the chemically component parts of the decomposed liquid for the purpose of performing synthesis.

16. A process consisting of evaporating a liquid to absorb its latent heat, absorbing the evolved vapor by means of a solvent, breaking up the solute into its chemically component parts to render the solvent capable of further absorption and liberating the products of chemical decomposition as by-products.

17. A refrigeration apparatus, including in combination, means for evaporating a liquid, means for absorbing the evolved vapor in a solvent, means for liberating this solute by breaking it down into its chemically component parts, means for synthesizing the chemically component parts to form the original liquid, and means for utilizing the synthesized liquid to replenish that liquid which was originally evaporated.

18. A refrigeration apparatus as claimed in claim 17, wherein electrolysis is employed for breaking the liquid into its component parts.

19. A refrigeration apparatus as claimed in claim 17, wherein the synthesizing means is a radio chemical means.

20. A refrigeration apparatus as claimed in claim 17, wherein the synthesizing means is a means for inducing a current in the chemically component parts of the decomposed liquid for the purpose of performing synthesis.

21. A refrigeration apparatus as claimed in claim 17, wherein the liquid used is water and the solvent sulphuric acid.

22. A refrigeration apparatus as claimed in claim 17, wherein means adjacent to the evaporating means is provided to act as a sump to retain the liquid and solvent should the apparatus be laid upon one side.

23. A refrigeration apparatus as claimed in claim 17, wherein the means for liberating the solute by breaking it down into its component parts is an electrical means, and wherein the synthesizing means includes means for applying an electrical current to such component parts.

24. A refrigeration apparatus as claimed in claim 17, wherein an electrical transformer induces an electric current in the solute to break such solute down into its chemically component parts.

25. A refrigeration apparatus as claimed in claim 17, wherein the synthesizing means includes an electrostatic means for inducing an electrical current in the chemically component parts of the decomposed liquid.

26. A refrigeration apparatus as claimed in claim 17, wherein there is thermostatically controlled means for operating the apparatus due to the rise and fall of the temperature in the evaporating means.

27. A refrigeration apparatus, including in combination means for evaporating a liquid and having an evaporation chamber, means for absorbing the evolved vapor in a solvent and having an absorbing chamber, an electrolysis chamber, means for conducting the solution from the absorbing chamber to the electrolysis chamber, electrical means for breaking down the solute in the electrolysis chamber, a separation chamber to receive the solvent from the electrolysis chamber and to separate the solvent and the products of electrolysis, means to conduct the solvent back to the absorbing chamber, means for synthesizing the products of electrolysis and for returning them to their original liquid form, and means for returning the synthesized liquid to the evaporation chamber.

28. A refrigeration apparatus as claimed in claim 27, wherein there is a means for balancing the pressure difference between the absorption chamber and the electrolysis chamber, independent means for balancing the pressure difference between the separation and absorption chambers, and means for balancing the pressure difference between the synthesizing means and the evaporation chamber.

FORREST LE GRAND BRYANT.